(12) United States Patent
Koeplinger et al.

(10) Patent No.: US 12,254,300 B2
(45) Date of Patent: Mar. 18, 2025

(54) MERGING BUFFER ACCESS OPERATIONS IN A COARSE-GRAINED RECONFIGURABLE COMPUTING SYSTEM

(71) Applicant: SambaNova Systems, Inc., Palo Alto, CA (US)

(72) Inventors: David Alan Koeplinger, Palo Alto, CA (US); Adam Bordelon, Palo Alto, CA (US); Weihang Fan, Mountain View, CA (US); Kevin Brown, Palo Alto, CA (US); Weiwei Chen, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 331 days.

(21) Appl. No.: 17/974,910

(22) Filed: Oct. 27, 2022

(65) Prior Publication Data

US 2023/0325312 A1    Oct. 12, 2023

Related U.S. Application Data

(60) Provisional application No. 63/328,128, filed on Apr. 6, 2022.

(51) Int. Cl.
  *G06F 8/41*    (2018.01)
(52) U.S. Cl.
  CPC ............... *G06F 8/45* (2013.01); *G06F 8/433* (2013.01); *G06F 8/4441* (2013.01); *G06F 2212/1041* (2013.01)
(58) Field of Classification Search
  None
  See application file for complete search history.

(56) References Cited

U.S. PATENT DOCUMENTS 10,515,118 B2 * 12/2019 Simitsis ............. G06F 16/2372
11,410,027 B2 *  8/2022 Chen ..................... G06N 3/063
(Continued)

FOREIGN PATENT DOCUMENTS

CN    112567340 A  *  3/2021  .......... G06F 9/3004
CN    113505766 A  * 10/2021
(Continued)

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Philip Wang
(74) *Attorney, Agent, or Firm* — Flagship Patents; Sikander M. Khan; Bruce A. Young

(57) ABSTRACT

A method for merging buffers and associated operations includes receiving a compute graph for a reconfigurable dataflow computing system and conducting a buffer allocation and merging process responsive to determining that a first operation specified by a first operation node is a memory indexing operation and that the first operation node is a producer for exactly one consuming node that specifies a second operation. The buffer allocation and merging process may include replacing the first operation node and the consuming node with a merged buffer node within the graph responsive to determining that the first operation and the second operation can be merged into a merged indexing operation and that the resource cost of the merged node is less than the sum of the resource costs of separate buffer nodes. A corresponding system and computer readable medium are also disclosed herein.

25 Claims, 13 Drawing Sheets

(56) References Cited

U.S. PATENT DOCUMENTS

| | | | | |
|---|---|---|---|---|
| 11,709,664 | B2* | 7/2023 | Chen | G06F 15/7867 |
| | | | | 717/150 |
| 11,782,706 | B1* | 10/2023 | Diamant | G06N 3/088 |
| | | | | 712/221 |
| 12,121,821 | B2* | 10/2024 | Cella | G07F 17/3227 |
| 12,126,454 | B2* | 10/2024 | Oizumi | H04W 72/0446 |
| 2013/0110766 | A1* | 5/2013 | Promhouse | G06F 16/2468 |
| | | | | 707/607 |
| 2016/0161976 | A1* | 6/2016 | Cho | G06F 17/10 |
| | | | | 708/235 |
| 2016/0351263 | A1* | 12/2016 | Balluchi | G11C 16/3436 |
| 2019/0227777 | A1* | 7/2019 | ChoFleming, Jr. | G06F 8/34 |
| 2019/0229996 | A1* | 7/2019 | ChoFleming, Jr. | H04L 41/12 |
| 2020/0082487 | A1* | 3/2020 | Kishikawa | G06Q 10/08 |
| 2020/0133859 | A1* | 4/2020 | Gottin | G06F 12/0806 |
| 2022/0100680 | A1* | 3/2022 | Chrysos | G06F 13/4027 |
| 2023/0195627 | A1* | 6/2023 | Ye | G06F 12/0806 |
| | | | | 711/118 |
| 2023/0305823 | A1* | 9/2023 | Wang | G06F 8/45 |
| 2024/0357481 | A1* | 10/2024 | Hua | H04W 76/10 |

FOREIGN PATENT DOCUMENTS

| | | | | |
|---|---|---|---|---|
| CN | 115328401 B | * | 2/2024 | G06F 13/1668 |
| CN | 114237122 B | * | 9/2024 | G05B 19/0423 |
| WO | 2010142987 A1 | | 12/2010 | |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

* cited by examiner

730 →

Template Dataflow Statements | Tensor Size
%1 = tlir.Region(name: "In0"): NxCxMxK bf16
%2 = tlir.Region(name: "Weight"): KxN bf16
%3 = tlir.Region(name: "Bias"): 1xN bf16
%4 = tlir.Region(name: "Out0"): NxCxMxN bf16
%5 = tlir.Load(%2)
%6 = tlir.Load(%3)  ╱732
%7 = tlir.MetaPipeline(iters: N) {
   %8 = tlir.Load(%1, dim: 1): CxMxK bf16
   %9 = tlir.Buffer(%5, depth: 2):  ╱732    CxMxK bf16
   %10 = tlir.MetaPipeline(iters: C) {
     %11 = tlir.ReadSlice(%9, dim: 1): MxK bf16
     %12 = tlir.Linear(%5, %11): MxN bf16
     %13 = tlir.Buffer(%12, depth: 2): MxN bf16
     %14 = tlir.AddBias(%13, %6): MxN bf16
     %15 = air.ReLU(%14): MxN bf16
     %16 = air.Exp(%15): MxN bf16
     %17 = tlir.Buffer(%16, depth: 2): MxN bf16
     %18 = tlir.Sum(%17, dim: 1): Mx1 bf16
     %19 = tlir.Div(%17, %18): MxN bf16
     %20 = tlir.Store(%4, %19)
   }
}

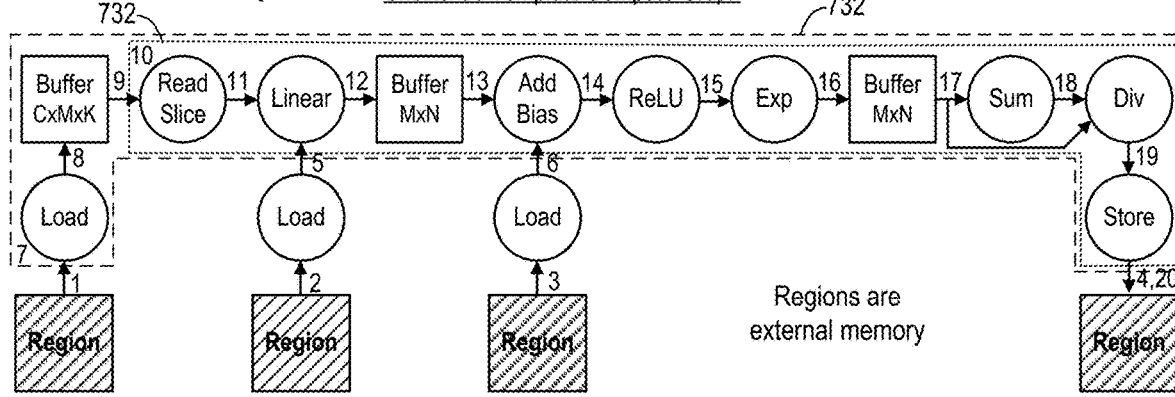

FIG. 7C

OP1 = Memory Indexing Operation with Single Consumer

OP2 Is Mergable with OP1

Mergable Buffer View Operations

| Operation | | Write | | | | | | Buffer | | Read | | | |
|---|---|---|---|---|---|---|---|---|---|---|---|---|---|
| | | VT | T Concat | Concat View | Layout Cast | Permute View | Reshape | Split View | VT | Logical T | Physical T | T Slice |
| WRITE SIDE | tconcat | | | | | | | | | | | |
| | concat_view | | | | | | | | | | | |
| | layout_cast | X | | | | | | | | | | |
| | permute_view | X | | | X | X | X | | | | | |
| | reshape | X | | | | X | X | | | | | |
| | split_view | X | | | | | | | | | | X |
| | VT | X | | X | X | X | X | X | X | X | X | |
| | logicalT | | X | | X | X | | | X | X | X | |
| | physicalT | | X | | | X | | | X | X | X | |
| | tslice | X | | | | | | | | | | |
| READ SIDE | tconcat | | | | | | | | | | | |
| | concat_view | | | | X | | | | | | | |
| | layout_cast | X | | | | | X | | X | X | X | |
| | permute_view | X | | | X | X | | | X | X | X | |
| | reshape | X | | | X | X | | | | | | |
| | split_view | X | | | X | X | | X | X | X | | |
| | VT | X | X | X | X | X | X | X | X | X | X | |
| | logicalT | X | X | | X | X | X | | X | X | X | |
| | physicalT | X | | | X | X | X | | X | X | X | X |
| | tslice | X | | | | | | | X | | | |

FIG. 11

```
function fuseMemoryOps(graph):
    for each operation op1 in the graph:
        if op1 is a memory indexing operation:
            if op1 has exactly one consumer op2:
                B1 = Buffer(op1)
                B2 = Buffer(op2)
                    if B1 and B2 can be fused:
                        F = fuse_buffers(B1, B2)
                        if cost(F) <= cost(B1) + cost(B2):
                            replace op1 and op2 in the graph with F
                            break
                    else:
                        delete B1 and B2
    repeat until graph is unchanged function cost(buffer):
    resources = 0
    for each channel in buffer:
        bytes = physical_bytes(buffer, channel shape) * buffer.depth
        cost = ceiling(bytes / BytesPerResource)
        resources += (cost > 1) ? cost + 1 : cost
    return resources
```

FIG. 12

MERGING BUFFER ACCESS OPERATIONS IN A COARSE-GRAINED RECONFIGURABLE COMPUTING SYSTEM

RELATED APPLICATIONS AND DOCUMENTS

This application claims the benefit of (priority to) U.S. Provisional Patent Application No. 63/328,128, filed Apr. 6, 2022, entitled "BUFFER FUSION". This application is also related to the following papers and commonly owned applications:

Zhang et al., "SARA: Scaling a Reconfigurable Dataflow Accelerator," 2021 ACM/IEEE 48th Annual International Symposium on Computer Architecture (ISCA), 2021, pp. 1041-1054;

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 17/326,128, filed May 20, 2021, entitled "COMPILER FLOW LOGIC FOR RECONFIGURABLE ARCHITECTURES";

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION";

U.S. Nonprovisional patent application Ser. No. 16/890,841, filed Jun. 2, 2020, entitled "ANTI-CONGESTION FLOW CONTROL FOR RECONFIGURABLE PROCESSORS";

All of the related applications and documents listed above are hereby incorporated by reference herein for all purposes.

BACKGROUND

The present subject matter relates to buffer access operations in a coarse-grained reconfigurable computing environment.

Reconfigurable processors can be configured to implement a variety of functions more efficiently or faster than might be achieved using a general-purpose processor executing a computer program. So called coarse-grained reconfigurable (i.e., CGR) architectures are being developed in which the configurable units in the array are more complex than used in typical, more fine-grained FPGAs, and may enable faster or more efficient execution of various classes of functions. For example, CGR architectures have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the foregoing advances, efficient data access presents a challenge for reconfigurable coarse-grained computing systems.

SUMMARY OF THE INVENTION

A system for merging buffers and associated operations in a reconfigurable computing environment includes an allocation module configured to receive a compute graph for a reconfigurable dataflow computing system, the compute graph comprising operation nodes that specify operations and edges that specify producer and consumer relationships between operations. The allocation module may be configured to conduct a buffer allocation and merging process responsive to determining that a first operation specified by a first operation node is a memory indexing operation and that the first operation node is a producer for exactly one consuming node that specifies a second operation. In one implementation, the buffer allocation and merging process includes replacing the first operation node and the consuming node with a merged buffer node within the compute graph responsive to determining that the first operation and the second operation can be merged into a merged indexing operation and that the resource cost of the merged node is less than the sum of the resource costs of separate buffer nodes.

A method for merging buffers and associated operations in a reconfigurable computing system includes receiving a compute graph for a reconfigurable dataflow computing system, the compute graph comprising operation nodes that specify operations and edges that specify producer and consumer relationships between operations and conducting the buffer allocation and merging process responsive to determining that a first operation specified by a first operation node is a memory indexing operation and that the first operation node is a producer for exactly one consuming node that specifies a second operation. A computer readable medium having the foregoing method encoded thereon is also disclosed herein.

BRIEF DESCRIPTION OF THE DRAWINGS

FIGS. 7A-7E illustrate various representations of an example user program corresponding to various stages of a compiler stack such as the compiler stack of FIG. 6.

FIG. 11 shows one example of an operation merging compatibility table suitable for the method depicted in FIG. 10.

FIG. 12 shows one example of pseudo-code consistent with the method depicted in FIG. 10.

Figure 1:
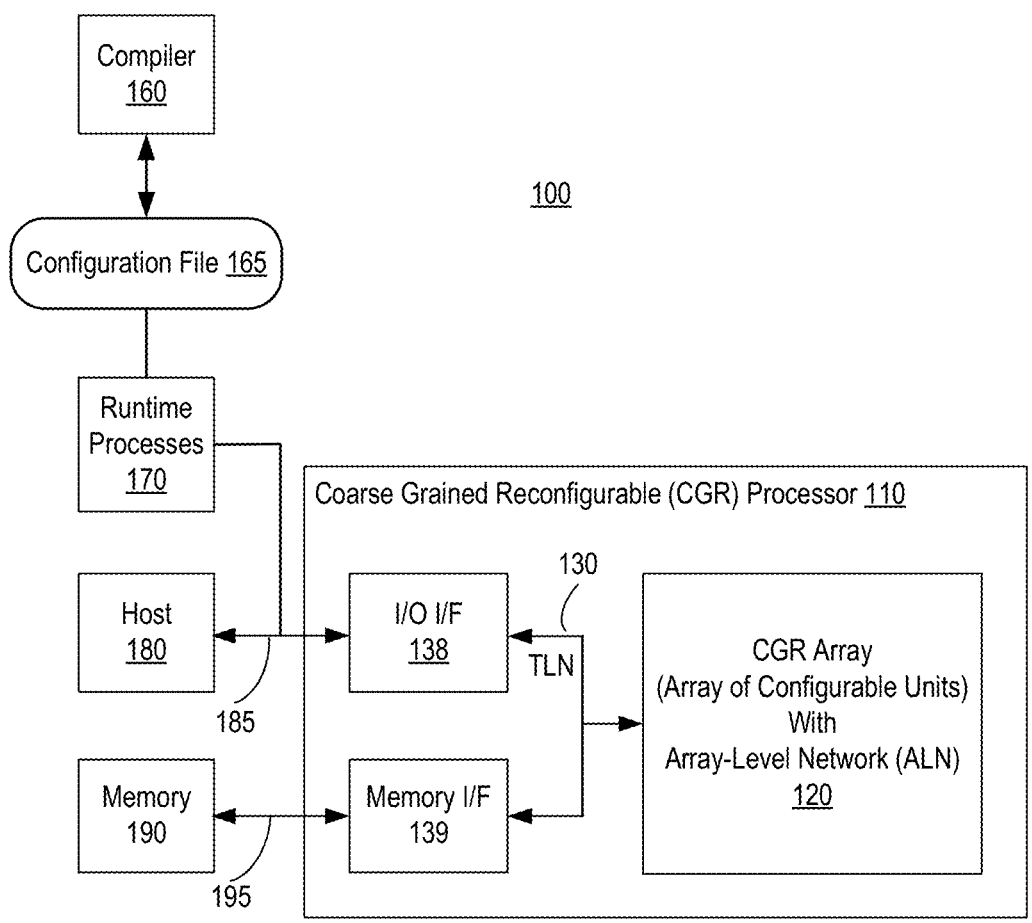
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).
AI—artificial intelligence.
AIR—arithmetic or algebraic intermediate representation.
ALN—array-level network.
Buffer—an intermediate storage of data.
CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.
CGRA—coarse-grained reconfigurable architecture. A data processor architecture that includes one or more arrays (CGR arrays) of CGR units.
Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 6.
Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.
CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.
CU—coalescing unit.
Data Flow Graph—a computation graph that includes one or more loops that may be nested, and wherein nodes can send messages to nodes in earlier layers to control the dataflow between the layers.
Datapath—a collection of functional units that perform data processing operations. The functional units may include memory, multiplexers, ALUs, SIMDs, multipliers, registers, buses, etc.
FCMU—fused compute and memory unit—a circuit that includes both a memory unit and a compute unit.
Graph—a collection of nodes connected by edges. Nodes may represent various kinds of items or operations, dependent on the type of graph. Edges may represent relationships, directions, dependencies, etc.
IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

IMPLEMENTATIONS

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120 (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
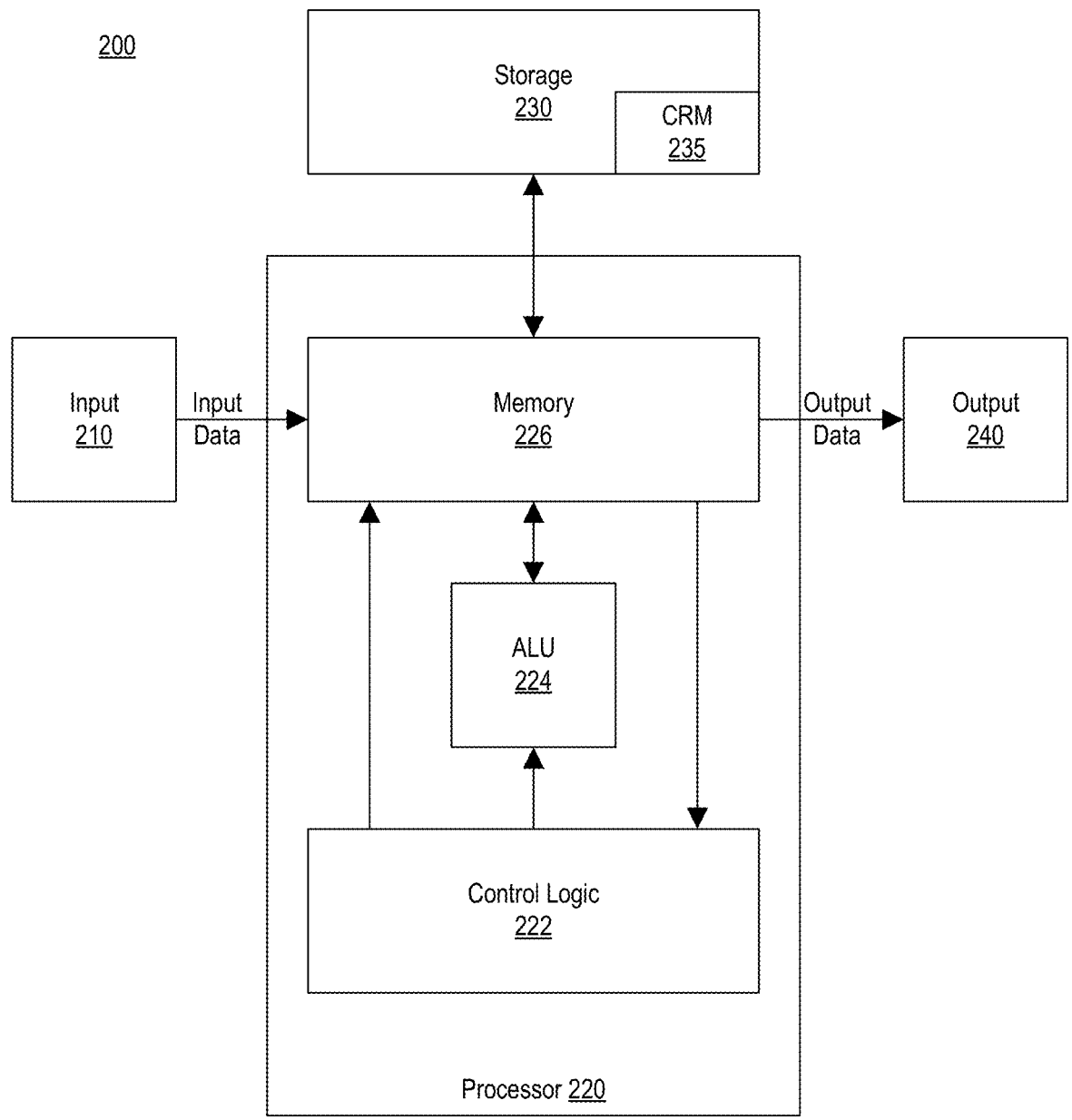
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
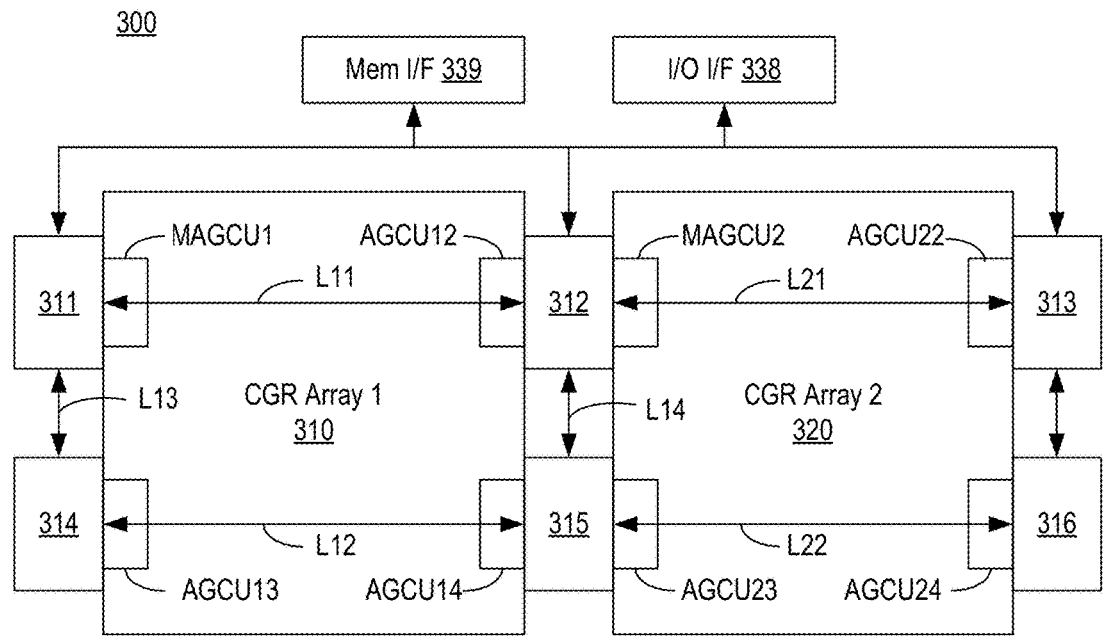
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
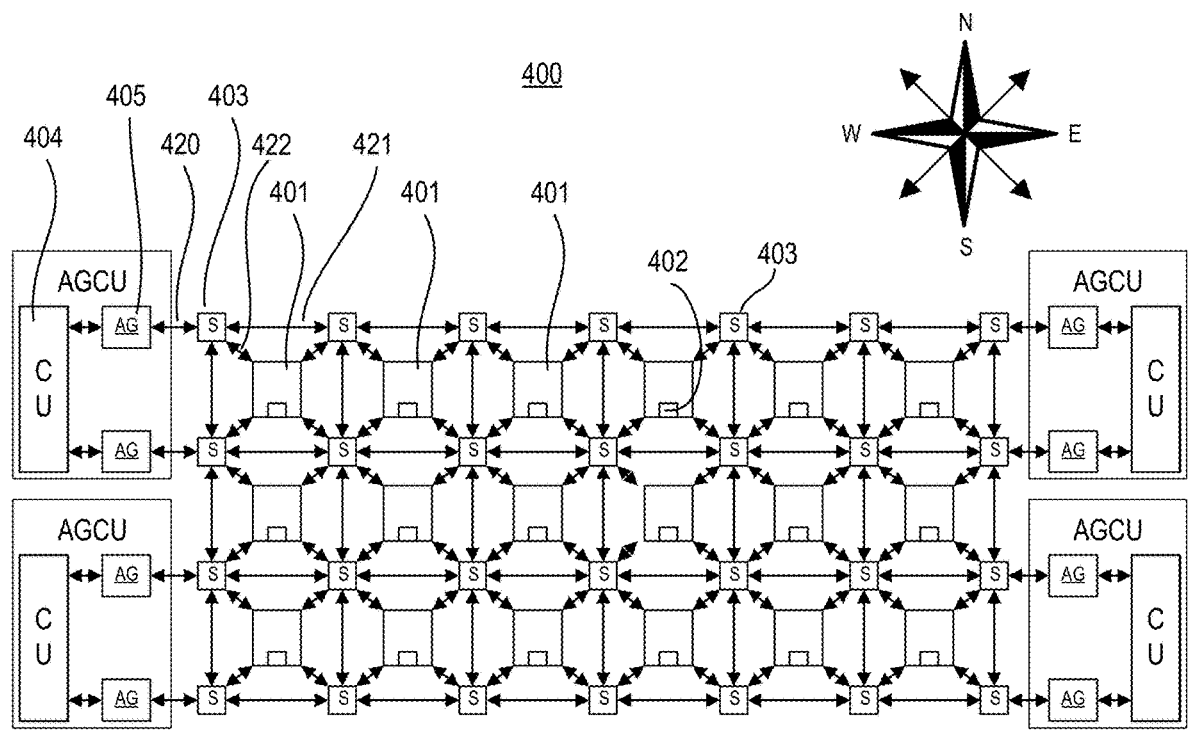
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests.

Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
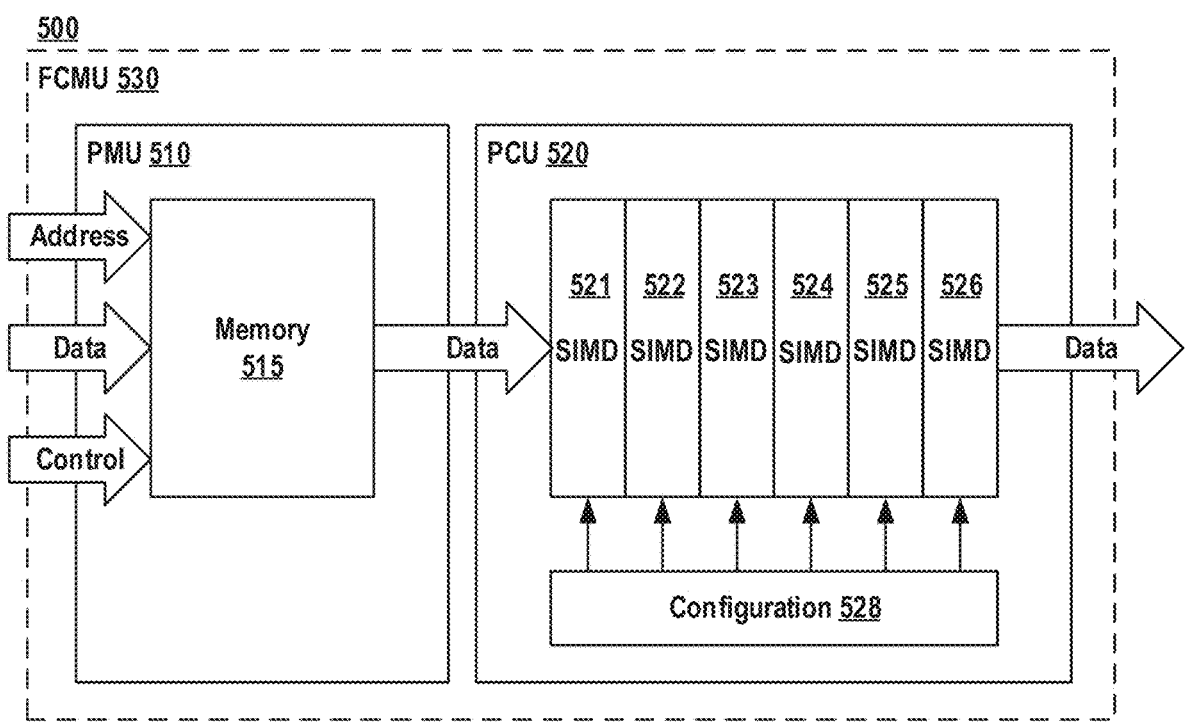
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
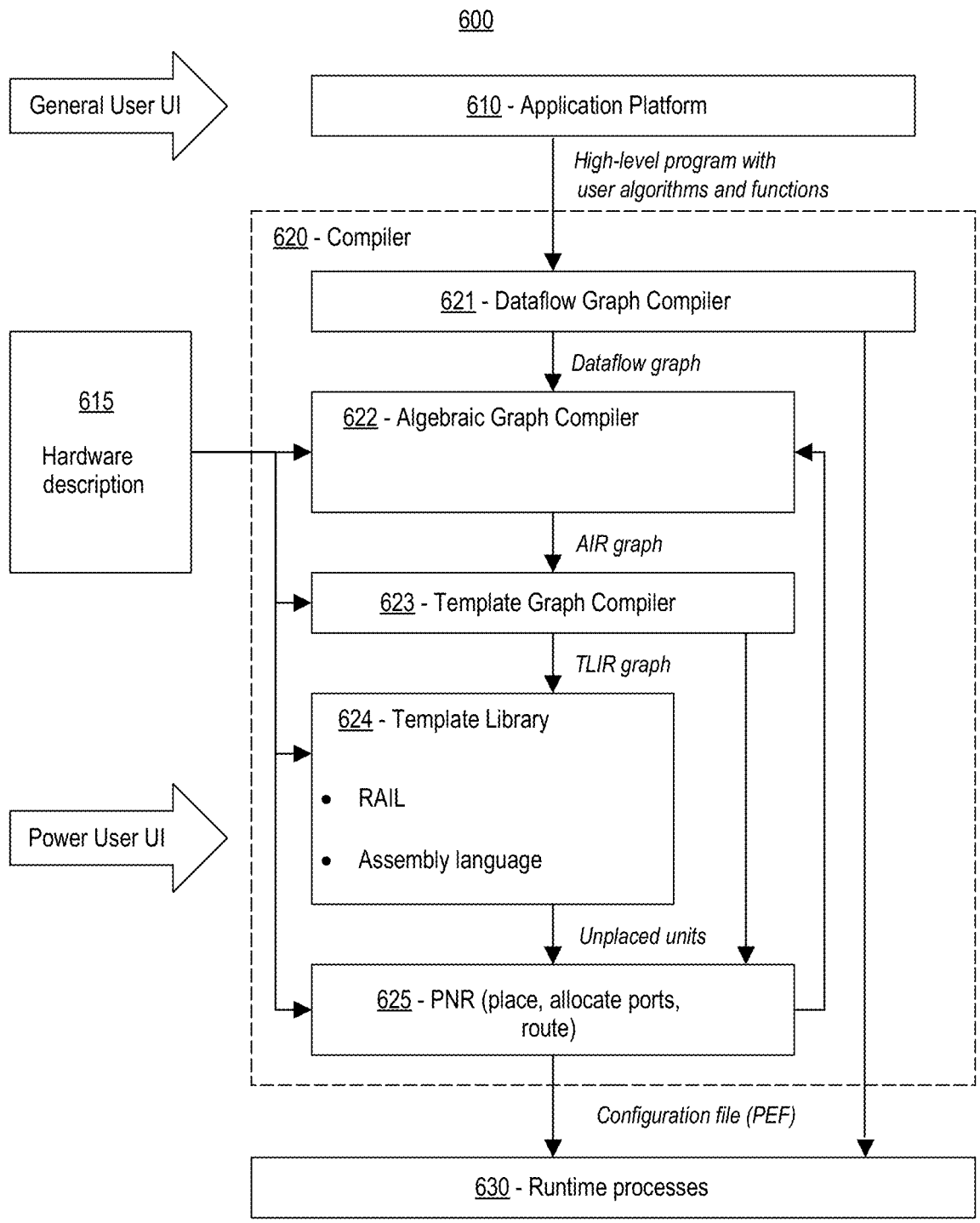
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Figure 7A:
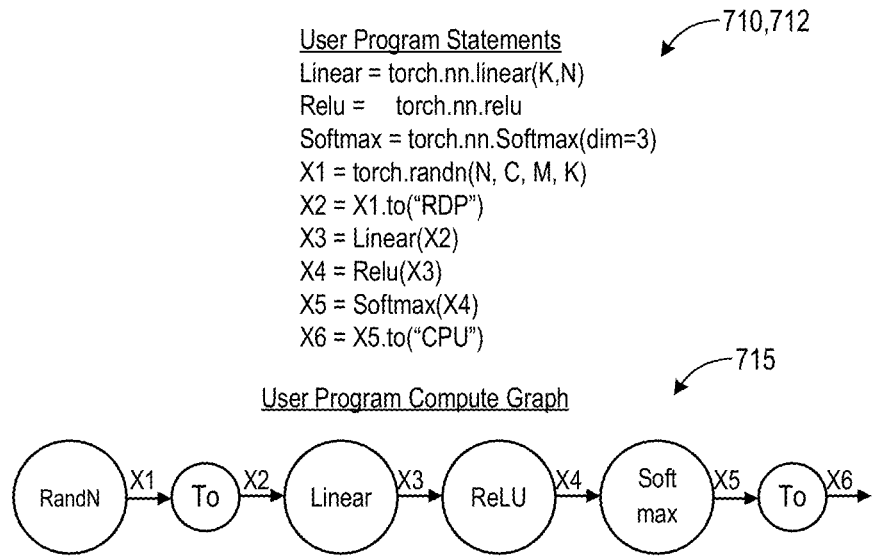
Figure 7B:
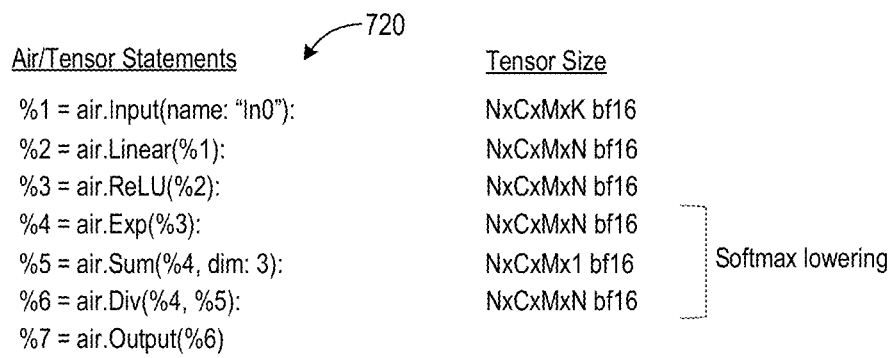
Figure 7B:
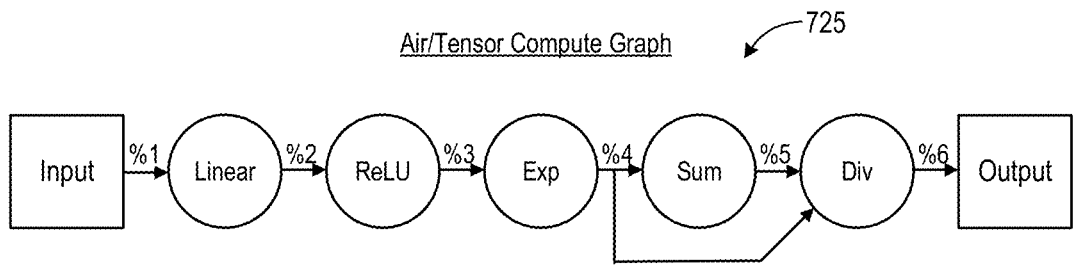

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
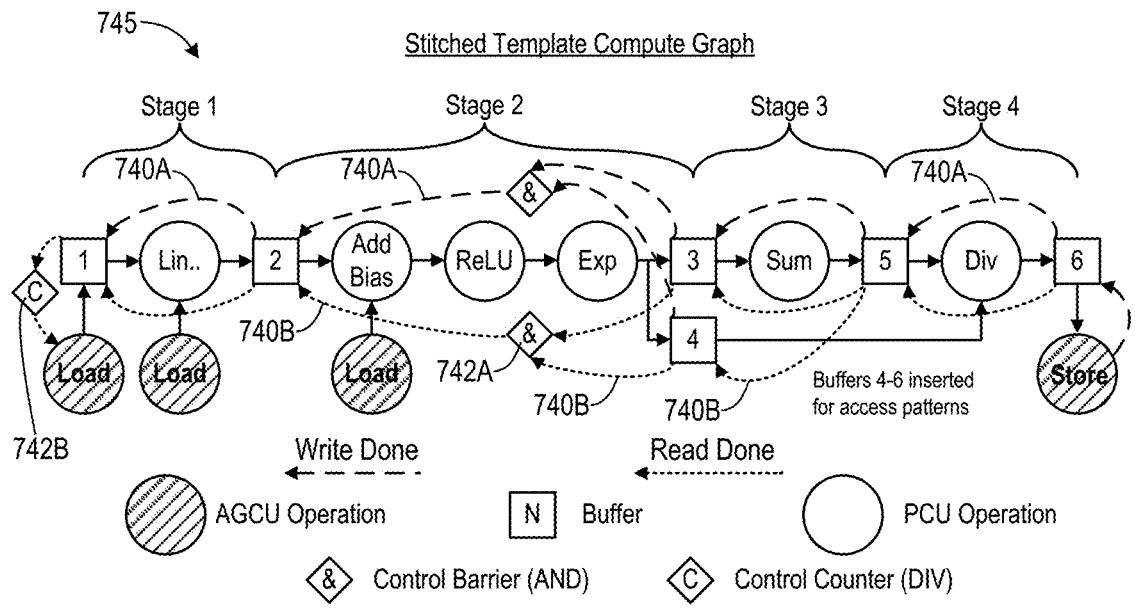
Figure 7E:
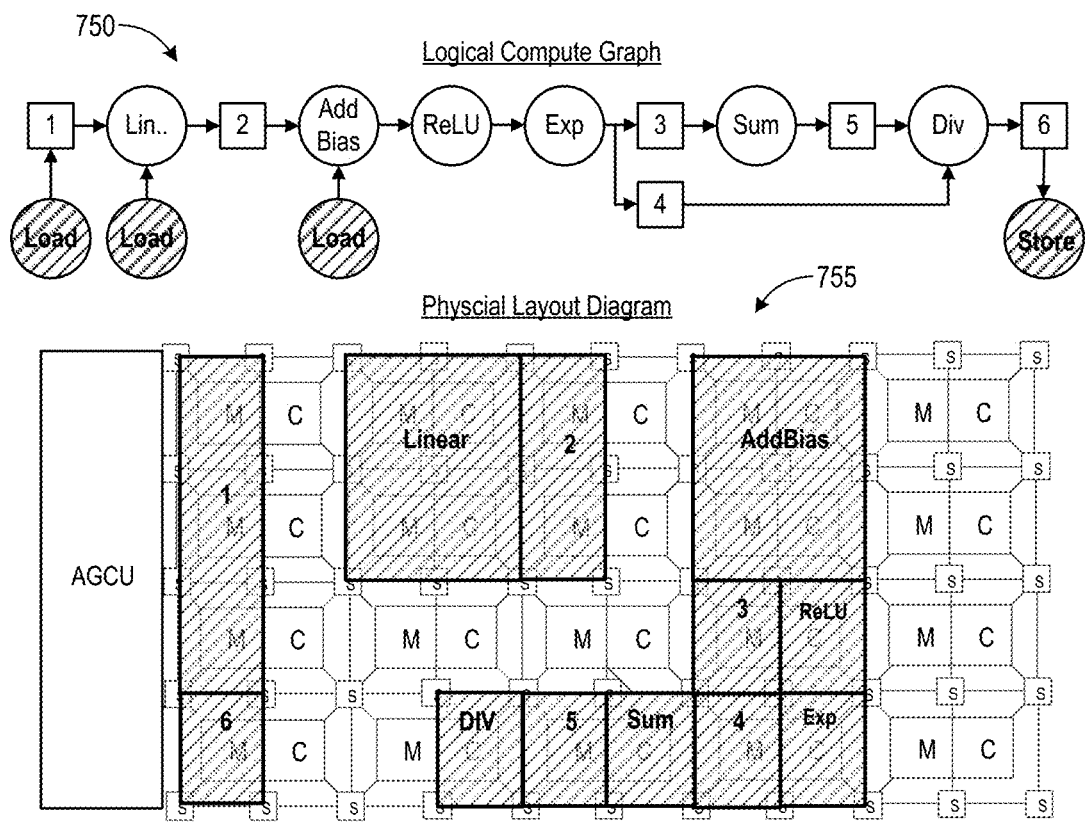

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units.

PNR 625 also determines physical data channels to ble communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
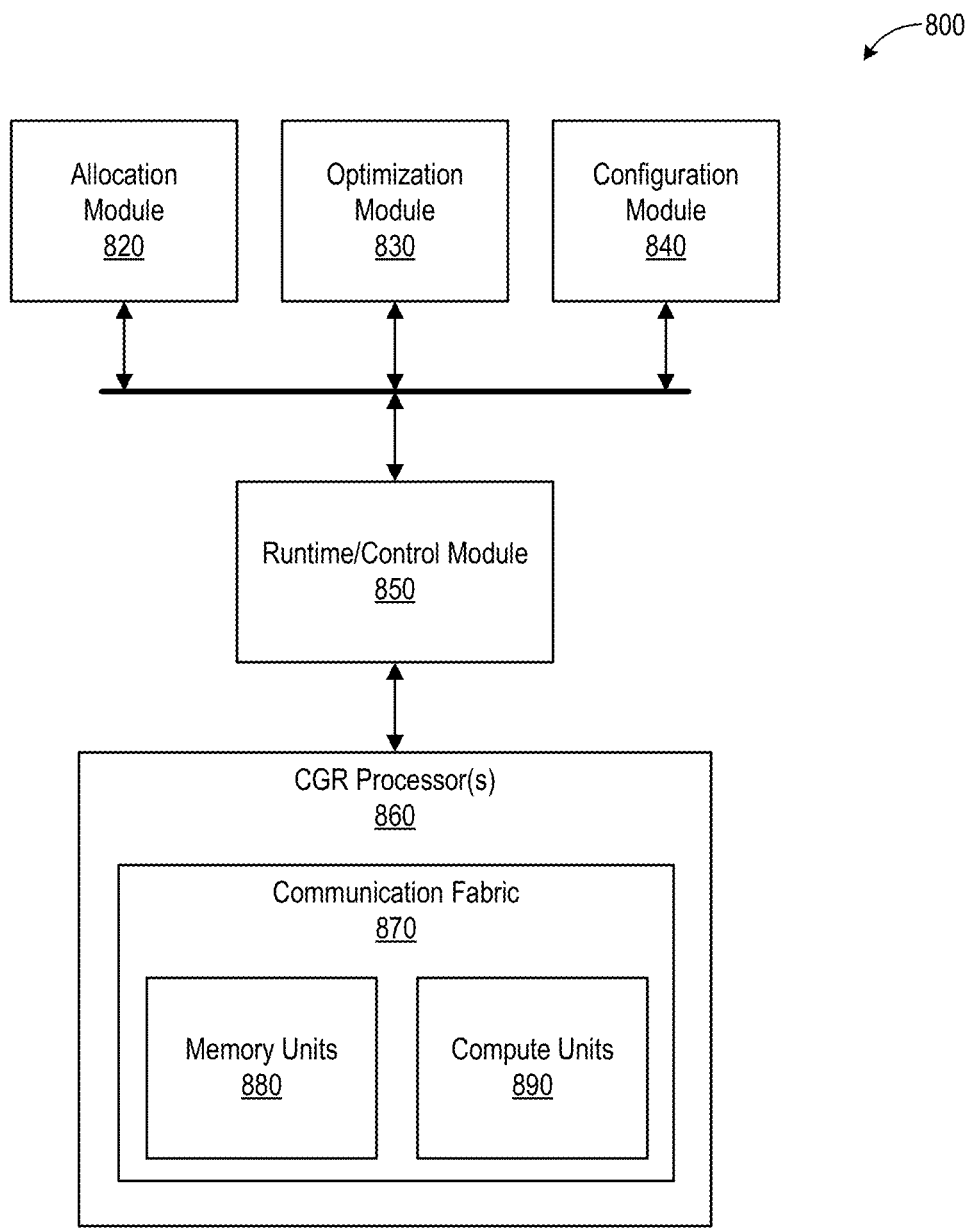
FIG. 8 is a block diagram illustrating select portions of one example of a dataflow computing system.

FIG. 8 is a block diagram illustrating select portions of one example of a dataflow computing system 800. The depicted dataflow computing system 800 includes an allocation module 820, an optimization module 830, a configuration module 840, a runtime/control module 850, and one or more CGR processors (RDUs) 860 each comprising a communication fabric 870, memory units 880 and compute units 890. The dataflow computing system 800 enables the allocation and deployment of computing resources to dataflow computing tasks.

The allocation module 820 allocates logical and physical resources including buffers and memory units to dataflow computing tasks. The allocation module 820 may also convert logical resources to physical resources and, in conjunction with the optimization module 830, optimize the spatial and temporal use of those resources.

The configuration module 840 may generate configuration information including configuration information for the allocated and optimized resources. The runtime/control module 850 may communicate compute unit configuration information and memory unit configuration information to the RDU(s) and initiate data flow in the computing grid. The communication fabric 870 may enable communication between the RDU control module 850 and memory units 880 and compute units 890 within the RDU(s) 860.

Figure 9A:
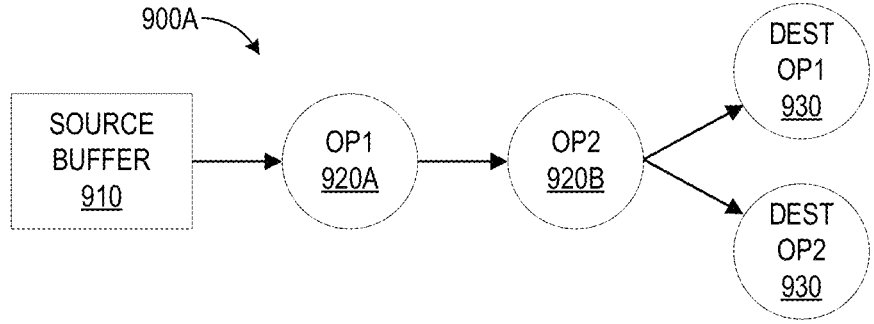
FIGS. 9A-9C are compute graphs that illustrate one example of a buffer allocation and merging process suitable for CGR computing systems.
Figure 9B:
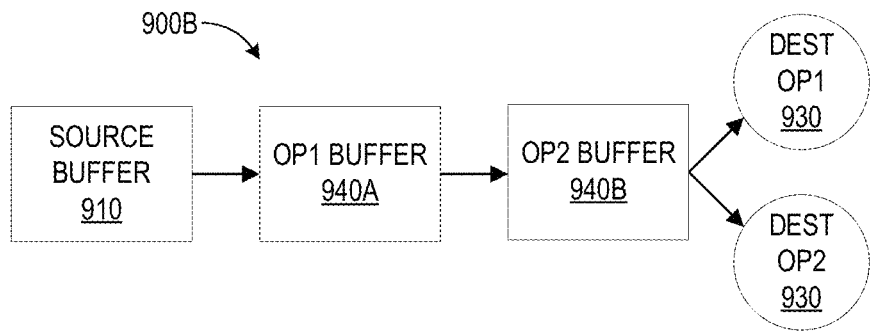
Figure 9C:
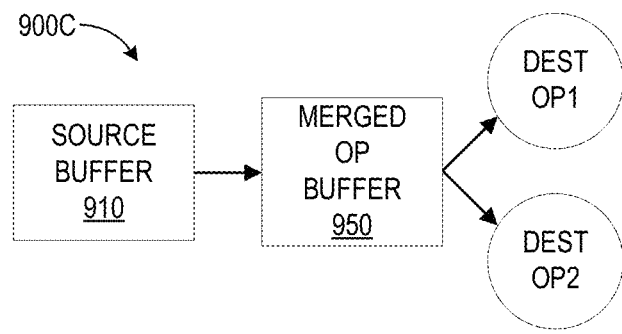

FIGS. 9A-9C are compute graphs 900 that illustrate one example of a buffer allocation and merging process suitable for coarse-grained reconfigurable computing systems. The depicted compute graphs 900 illustrate the local changes that can be made to a compute graph to optimize the utilization of memory units in a CGR computing system. As computing resources are allocated to a computing task, buffers such as the source buffer 910 may be inserted into a compute graph 900A in conjunction with compiling a computing task for execution on CGR processors. Each buffer may be a logical resource that represents one or more physical memory units as needed to execute the operations indicated in the compute graph.

In the depicted example, the compute graph 900A includes two operation nodes 920A and 920B that reference operations that are to be sequentially applied to data supplied by the source buffer 910. Subsequently, in the depicted example, the results are then concurrently consumed by the operations nodes 930.

Some of the operations referenced in the compute graph 900A may be memory indexing operations that are used to compute indices for accessing a tensor or the like. In the depicted example, the operation nodes 920A and 920B are assumed to be memory indexing operations. In such cases, the memory indexing need not be performed by a compute unit but may be executed by memory units in a CGR dataflow computing system (e.g., in conjunction with accessing tensor data within the assigned memory units). Consequently, as shown in FIG. 9B the operation nodes 920A and 920B may be replaced in the compute graph 900A by buffer nodes 940A and 940B to form the compute graph 900B.

In some cases, the indexing operations performed by the buffers 940A and 940B may be merged into a single indexing operation and require fewer hardware resources. Consequently, as shown in FIG. 9C the buffers 940A and 940B may be replaced in those cases in the compute graph 900B by a merged operation buffer 950 to produce the compute graph 900C.

Figure 10:
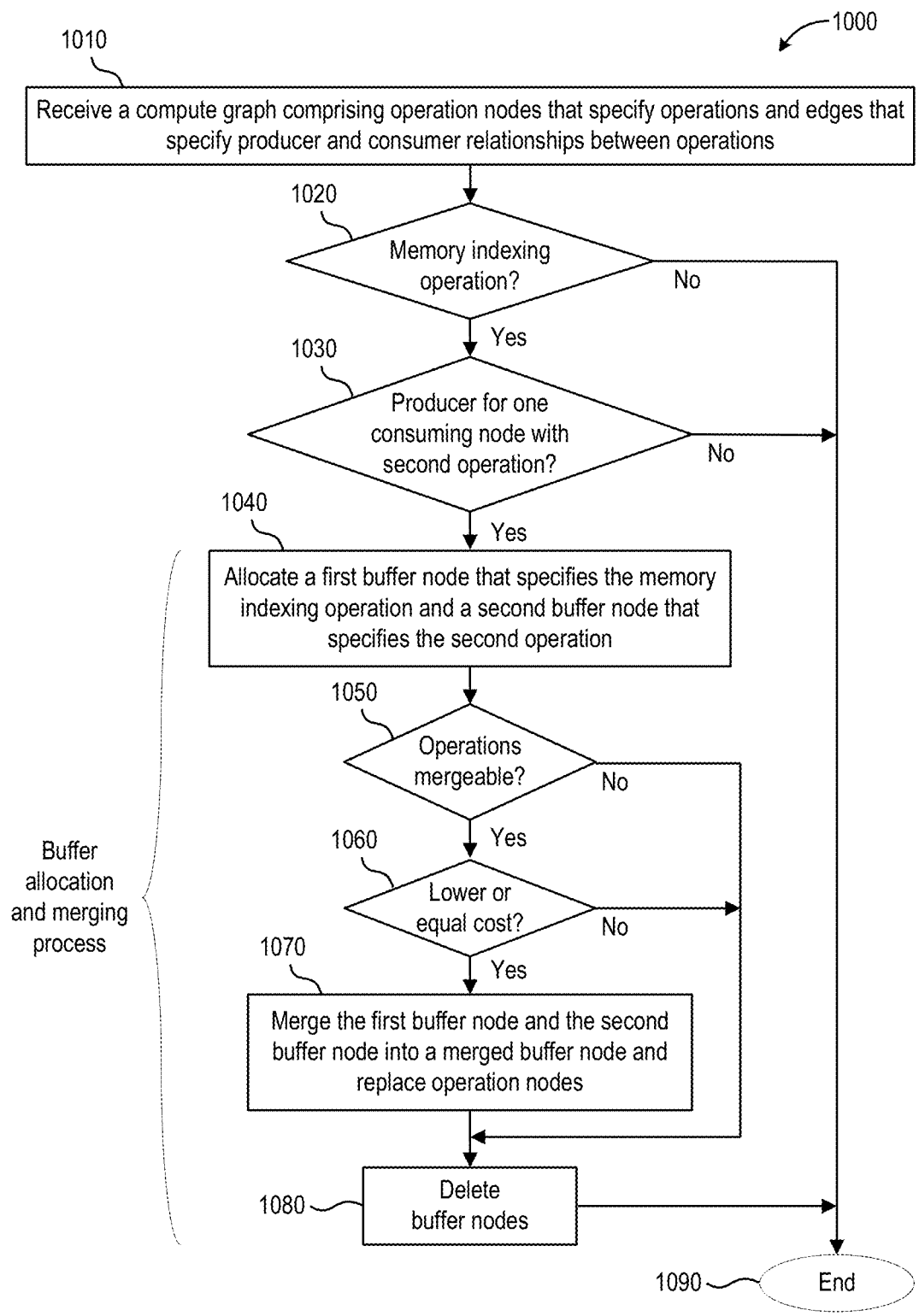
FIG. 10 is a flowchart depicting one example of a buffer allocation and merging method consistent with the process depicted in FIGS. 9A-9C.

FIG. 10 is a flowchart depicting one example of a buffer allocation and merging method 1000 consistent with the process depicted in FIGS. 9A-7C. As depicted, the buffer allocation and merging method includes receiving (1010) a compute graph, determining (1020) whether a node references a memory indexing operation, determining (1030) whether the node is a producer for one consuming node, allocating (1040) first and second buffer nodes, determining (1050) whether the operations are mergeable, determining (1060) whether a merged buffer is lower or equal cost, merging (1070) the first and second buffer nodes, deleting (1080) the buffer nodes, and ending (1090) the method. The buffer allocation and merging method 1000 may be conducted by the allocation module 820 and the optimization module 830 of the dataflow computing system 800.

Receiving (1010) a compute graph may include receiving (at least a portion of) a compute graph corresponding to a computing task for a reconfigurable dataflow computing system. In some cases, the computing task is initially specified via functions calls to libraries that support Machine Learning, AI, scientific computing and the like. The computing task may also be specified via parameterized templates for a CGR system. The function calls or templates (as configured by the associated parameters) may be converted to a compute graph by the upper layers of a compiler such as the compiler stack 100B shown in FIG. 1B. The compute graph may be a dataflow graph that includes operation nodes that specify operations and directed edges that specify producer and consumer relationships between operations.

Determining (1020) whether a node specifies a memory indexing operation may include parsing an expression corresponding to the node and determining whether the expression is an indexing expression for a tensor or the like. In some cases, the parsing is done by a previous layer of a compiler stack and the node is marked as a memory indexing operation.

Determining (1030) whether the node is a producer for one consuming node may include determining whether the node that specifies a memory indexing operation is connected to just one consuming node via an edge in the compute graph. Determining (1030) may also include determining whether the consuming node specifies a second memory indexing operation. If the described criteria are not met the method ends. If the described criteria are met, the method proceeds by allocating (1040) first and second buffer nodes.

Allocating (1040) first and second buffer nodes may include invoking a buffer constructor function (in an object-oriented environment) for the producer node (i.e., object) and the consumer node (i.e., object). Determining (1050) whether the operations are mergeable may include accessing an operation merging compatibility table. The table may indicate which combinations of producer and consumer operations can be merged. See FIG. 9 for one example of such a table.

Determining (1060) whether a merged buffer is lower or equal cost may include invoking a cost function for each buffer node individually and comparing the total cost to the cost of a merged buffer. If the criteria used for the determining operations 1050 and 1060 are met, the method proceeds by merging (1070) the first buffer node and the second buffer node. Otherwise, the method skips to the deleting operation 1080.

Merging (1070) the first and second buffer nodes may include allocating a merged buffer and replacing the producer and consumer operation nodes in the compute graph with the merged buffer. Deleting (1080) the buffer nodes may include invoking a destructor for the first and second buffer nodes. Ending (1090) the method terminates the buffer allocation and merging method 1000.

It should be noted that the number of physical memory units assigned to implement a buffer (i.e., the buffer depth) may scale with the size of the tensor data stored within the buffer and the required bandwidth. In some implementations and/or situations, at least 2 memory units are assigned to each buffer and the depth of a merged buffer will generally be less than the depth of the unmerged buffers. For example, merging buffers of depth 2 and depth N may result in a merged buffer of depth N+1. In addition to lower memory requirements, merged buffers may reduce the latency of the computing dataflow.

FIG. 11 shows one example of an operation merging compatibility table suitable for the method depicted in FIG. 10. As depicted, the rows of the compatibility table correspond to the second operation that is to be merged with a first operation specified in the columns of the compatibility table. Those cells marked with an 'X' indicate that the two operations specified in the row and column of the table can be merged into a merged operation. One of skill in the art will appreciate that the depicted table is not commutative.

One of skill in the art will also appreciate that buffers with no operations associated therewith can be merged with any operation. Similarly, two buffers with no operations associated therewith can be merged into a single buffer with no operations associated therewith.

FIG. 12 shows one example of pseudo-code 1200 consistent with the buffer allocation and merging method 1000 depicted in FIG. 10. The depicted pseudo-code 1200 includes a 'fuseMemoryOps' function and a 'cost' function.

The depicted pseudo-code 1200 is one example of a high-level implementation of the buffer allocation and merging method 1000.

The 'fuseMemoryOps' function receives a compute graph and checks each operation node in the graph on whether the operation specified by the node (op1) is a memory indexing operation. If the specified operation is a memory indexing operation, the function checks if the operation node has exactly one consuming node (op2). If so, the method allocates a first buffer B1 and a second buffer B2, for the producing node and the consuming node, respectively.

The 'fuseMemoryOps' function then checks if buffers B1 and B2 can be merged (fused). If so, the function determines if the cost of a merged buffer is greater than the sum of the cost of the two buffers. If it is greater the method deletes B1 and B2 and leaves the producing node and the consuming node untouched. If the cost of a merged buffer is not greater, the function replaces the producing and consuming nodes with a fused buffer F that merges the operations specified by the producing node op1 and the consuming node op2. Once the compute graph is processed, the above allocation and merging process may be restarted at the beginning of the graph and repeated until the compute graph remains unchanged. Subsequent passes may result in additional buffer allocation and merging beyond what was completed in the first pass.

One of skill in the art will appreciate that the 'fuseMemoryOps' function may replace multiple (e.g., many) sets of producing and consuming operation nodes in a compute graph with fused buffers that specify a merged memory indexing operation.

The examples disclosed herein include a method (and corresponding computer readable medium) for merging buffers and associated operations in a reconfigurable computing system, the method comprising:
  receiving a compute graph for a reconfigurable dataflow computing system, the compute graph comprising operation nodes that specify operations and edges that specify producer and consumer relationships between operations
  conducting a buffer allocation and merging process responsive to determining that a first operation specified by a first operation node is a memory indexing operation and that the first operation node is a producer for exactly one consuming node that specifies a second operation
  wherein the buffer allocation and merging process comprises:
    allocating a merged buffer node and replacing the first operation node and the consuming node with the merged buffer node within the graph responsive to determining that the first operation and the second operation can be merged into a merged indexing operation and that the resource cost of the merged node is less than the sum of the resource costs of separate buffer nodes for the first operation and the second operation
  Optional features for the above method include:
  wherein the separate buffer nodes comprise a first buffer node and a second buffer node
    wherein the buffer allocation and merging process comprises allocating the first buffer node that specifies the memory indexing operation and the second buffer node that specifies the second operation
      wherein the buffer allocation and merging process comprises merging the first buffer node and the second buffer node into the merged buffer node
      wherein determining that the first operation and the second operation can be merged into a merged indexing operation comprises accessing an operation merging compatibility table
  wherein the first operation is a read-side operation or a write-side operation
  wherein the second operation is a read-side operation or a write-side operation
  wherein the first operation is selected from the group consisting of a layout cast operation, a permute view operation, a reshape operation, a split view operation, a vector transpose operation, a logical transpose operation, a physical transpose operation and a temporal operation
  wherein the second operation is selected from the group consisting of a layout cast operation, a permute view operation, a reshape operation, a split view operation, a vector transpose operation, a logical transpose operation, a physical transpose operation and a temporal operation
  deleting the first buffer node and the second buffer node responsive to determining that the first operation and the second operation cannot be merged into a merged indexing operation
  deleting the first buffer node and the second buffer node responsive to determining that the resource cost of the merged node is greater than the sum of the resource costs of the first buffer node and the second buffer node The examples disclosed herein include a system for merging buffers and associated operations in a reconfigurable computing environment, the system comprising:
  an allocation module configured to receive a compute graph for a reconfigurable dataflow computing system, the compute graph comprising operation nodes that specify operations and edges that specify producer and consumer relationships between operations
  the allocation module configured to conduct a buffer allocation and merging process responsive to determining that a first operation specified by a first operation node is a memory indexing operation and that the first operation node is a producer for exactly one consuming node that specifies a second operation
  wherein the buffer allocation and merging process comprises:
    allocating a merged buffer node and replacing the first operation node and the consuming node with the merged buffer node within the graph responsive to determining that the first operation and the second operation can be merged into a merged indexing operation and that the resource cost of the merged node is less than the sum of the resource costs of separate buffer nodes for the first operation and the second operation
  Optional features for the above system include:
  wherein the separate buffer nodes comprise a first buffer node and a second buffer node
    wherein the buffer allocation and merging process comprises allocating the first buffer node that specifies the memory indexing operation and the second buffer node that specifies the second operation
      wherein the buffer allocation and merging process comprises merging the first buffer node and the second buffer node into the merged buffer node wherein the merged node specifies the merged indexing operation wherein determining that the first operation and the second operation can be merged into the merged indexing operation comprises accessing an operation merging compatibility table wherein the first operation is a read-side operation or a write-side operation wherein the second operation is a read-side operation or a write-side operation wherein the first operation is selected from the group consisting of a layout cast operation, a permute view operation, a reshape operation, a split view operation, a vector transpose operation, a logical transpose operation, a physical transpose operation and a temporal operation wherein the second operation is selected from the group consisting of a layout cast operation, a permute view operation, a reshape operation, a split view operation, a vector transpose operation, a logical transpose operation, a physical transpose operation and a temporal operation a configuration module configured to generate configuration information that enables the reconfigurable dataflow computing system to execute a dataflow computing task corresponding to the compute graph including the merged node a runtime module configured to configure the reconfigurable dataflow computing system using the configuration information the runtime module configured to launch execution of the dataflow computing task on a CGR processor The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

We claim as follows:

1. A system for merging buffers and associated operations in a reconfigurable computing environment, the system comprising:

an allocation module configured to receive a compute graph for a reconfigurable dataflow computing system, the compute graph comprising operation nodes that specify operations and edges that specify producer and consumer relationships between operations;

the allocation module configured to conduct a buffer allocation and merging process responsive to determining that a first operation specified by a first operation node is a memory indexing operation and that the first operation node is a producer for exactly one consuming node that specifies a second operation; and wherein the buffer allocation and merging process comprises allocating a merged buffer node and replacing the first operation node and the exactly one consuming node with the merged buffer node within the compute graph responsive to determining that the first operation and the second operation can be merged into a merged indexing operation and responsive to determining that a resource cost of the merged buffer node is less than a sum of resource costs for separate buffer nodes for the first operation and the second operation.

2. The system of claim 1, wherein the separate buffer nodes comprise a first buffer node and a second buffer node.

3. The system of claim 2, wherein the buffer allocation and merging process comprises allocating the first buffer node that specifies the memory indexing operation and the second buffer node that specifies the second operation.

4. The system of claim 3, wherein the buffer allocation and merging process comprises merging the first buffer node and the second buffer node into the merged buffer node.

5. The system of claim 1, wherein the merged buffer node specifies the merged indexing operation.

6. The system of claim 1, wherein determining that the first operation and the second operation can be merged into the merged indexing operation comprises accessing an operation merging compatibility table.

7. The system of claim 1, wherein the first operation is a read-side operation or a write-side operation.

8. The system of claim 1, wherein the second operation is a read-side operation or a write-side operation.

9. The system of claim 1, wherein the first operation is selected from the group consisting of a layout cast operation, a permute view operation, a reshape operation, a split view operation, a vector transpose operation, a logical transpose operation, a physical transpose operation and a temporal operation.

10. The system of claim 1, wherein the second operation is selected from the group consisting of a layout cast operation, a permute view operation, a reshape operation, a split view operation, a vector transpose operation, a logical transpose operation, a physical transpose operation and a temporal operation.

11. The system of claim 1, further comprising a configuration module configured to generate configuration information that enables the reconfigurable dataflow computing system to execute a dataflow computing task corresponding to the compute graph including the merged buffer node.

12. The system of claim 11, further comprising a runtime module configured to configure the reconfigurable dataflow computing system using the configuration information.

13. The system of claim 12, the runtime module further configured to launch execution of the dataflow computing task on a coarse-grained reconfigurable (CGR) processor.

14. A method for merging buffers and associated operations in a reconfigurable computing system, the method comprising:
receiving a compute graph for a reconfigurable dataflow computing system, the compute graph comprising operation nodes that specify operations and edges that specify producer and consumer relationships between operations;
conducting a buffer allocation and merging process responsive to determining that a first operation specified by a first operation node is a memory indexing operation and that the first operation node is a producer for exactly one consuming node that specifies a second operation;
wherein the buffer allocation and merging process allocating a merged buffer node and replacing the first operation node and the exactly one consuming node with the merged buffer node within the compute graph responsive to determining that the first operation and the second operation can be merged into a merged indexing operation and responsive to determining that a resource cost of the merged buffer node is less than a sum of resource costs for separate buffer nodes for the first operation and the second operation.

15. The method of claim 14, wherein the separate buffer nodes comprise a first buffer node and a second buffer node.

16. The method of claim 15, wherein the buffer allocation and merging process comprises allocating the first buffer node that specifies the memory indexing operation and the second buffer node that specifies the second operation.

17. The method of claim 16, wherein the buffer allocation and merging process comprises merging the first buffer node and the second buffer node into the merged buffer node.

18. The method of claim 14, wherein determining that the first operation and the second operation can be merged into a merged indexing operation comprises accessing an operation merging compatibility table.

19. The method of claim 14, wherein the first operation is a read-side operation or a write-side operation.

20. The method of claim 14, wherein the second operation is a read-side operation or a write-side operation.

21. The method of claim 14, wherein the first operation is selected from the group consisting of a layout cast operation, a permute view operation, a reshape operation, a split view operation, a vector transpose operation, a logical transpose operation, a physical transpose operation and a temporal operation.

22. The method of claim 14, wherein the second operation is selected from the group consisting of a layout cast operation, a permute view operation, a reshape operation, a split view operation, a vector transpose operation, a logical transpose operation, a physical transpose operation and a temporal operation.

23. The method of claim 15, further comprising deleting the first buffer node and the second buffer node responsive to determining that the first operation and the second operation cannot be merged into a merged indexing operation.

24. The method of claim 15, further comprising deleting the first buffer node and the second buffer node responsive to determining that the resource cost of the merged buffer node is greater than the sum of the resource costs of the first buffer node and the second buffer node.

25. A non-transitory computer-readable medium having instructions encoded thereon for conducting a method for merging buffers and associated operations in a reconfigurable computing system, the method comprising:
receiving a compute graph for a reconfigurable dataflow computing system, the compute graph comprising operation nodes that specify operations and edges that specify producer and consumer relationships between operations;
conducting a buffer allocation and merging process responsive to determining that a first operation specified by a first operation node is a memory indexing operation and that the first operation node is a producer for exactly one consuming node that specifies a second operation;
wherein the buffer allocation and merging process allocating a merged buffer node and replacing the first operation node and the exactly one consuming node with the merged buffer node within the compute graph responsive to determining that the first operation and the second operation can be merged into a merged indexing operation and responsive to determining that a resource cost of the merged buffer node is less than a sum of resource costs for separate buffer nodes for the first operation and the second operation.

* * * * *